(12) United States Patent
Arciniega

(10) Patent No.: US 12,025,169 B2
(45) Date of Patent: Jul. 2, 2024

(54) FASTENER INCLUDING A TRANSITION ZONE AND METHOD OF USE THEREOF

(71) Applicant: Howmet Aerospace Inc., Pittsburgh, PA (US)

(72) Inventor: Oviedo Arciniega, Perris, CA (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 629 days.

(21) Appl. No.: 16/967,913

(22) PCT Filed: May 21, 2018

(86) PCT No.: PCT/US2018/033601
§ 371 (c)(1),
(2) Date: Aug. 6, 2020

(87) PCT Pub. No.: WO2019/226144
PCT Pub. Date: Nov. 28, 2019

(65) Prior Publication Data
US 2021/0025434 A1    Jan. 28, 2021

(51) Int. Cl.
*F16B 35/04* (2006.01)
*F16B 19/05* (2006.01)

(52) U.S. Cl.
CPC .......... *F16B 35/048* (2013.01); *F16B 19/05* (2013.01)

(58) Field of Classification Search
CPC ...... F16B 19/05; F16B 35/041; F16B 35/048; F16B 4/004
USPC .......................................... 411/361, 424, 426
See application file for complete search history.

(56) References Cited

U.S. PATENT DOCUMENTS

| | | | |
|---|---|---|---|
| 3,748,948 A | 7/1973 | Schmitt | |
| 4,472,096 A * | 9/1984 | Ruhl | F16B 19/05 411/361 |
| 4,485,510 A | 12/1984 | Hatter et al. | |
| 4,842,466 A | 6/1989 | Wheeler et al. | |
| 4,915,559 A * | 4/1990 | Wheeler | F16B 33/02 411/366.3 |
| 5,039,265 A | 8/1991 | Rath et al. | |
| 5,788,441 A | 8/1998 | Karabestos et al. | |
| 6,149,363 A | 11/2000 | March | |
| 6,497,024 B2 | 12/2002 | Fulbright | |

(Continued)

OTHER PUBLICATIONS

International Search Report and Written Opinion for PCT/US2018/033601 mailed Feb. 19, 2019.

(Continued)

*Primary Examiner* — Flemming Saether
(74) *Attorney, Agent, or Firm* — K&L Gates LLP

(57) ABSTRACT

A fastener and a method of fastening are provided. The fastener can comprise a first end, an oppositely disposed second end, and an elongate portion intermediate the first end and the second end. The elongate portion comprises a first region adjacent to the first end and a second region adjacent to the second end. The first region extends a distance along the elongate portion and has a first diameter. The second region extends a distance along the elongate portion and has a second diameter different from the first diameter. The fastener comprises a transition zone which extends a distance along the elongate portion and connects the first region and the second region. The transition zone comprises a radiused region and a taper region.

17 Claims, 7 Drawing Sheets

(56) References Cited

U.S. PATENT DOCUMENTS

| | | | |
|---|---|---|---|
| 7,695,226 B2* | 4/2010 | March | F16B 33/00 |
| | | | 411/339 |
| 8,312,606 B2* | 11/2012 | Reid | B21J 15/147 |
| | | | 411/361 |
| 10,641,307 B2* | 5/2020 | Simpson | F16B 5/02 |
| 10,711,814 B2* | 7/2020 | Simpson | F16B 41/002 |
| 2008/0050199 A1 | 2/2008 | Park | |
| 2020/0291979 A1* | 9/2020 | Cowles, Jr. | F16B 35/048 |

OTHER PUBLICATIONS

Extended European Search Report for European Application No. 18919752.8 mailed Nov. 29, 2021.

* cited by examiner

FASTENER INCLUDING A TRANSITION ZONE AND METHOD OF USE THEREOF

CROSS REFERENCE

This application is a national stage application claiming priority to and the benefit of International Application No. PCT/US2018/033601, filed on May 21, 2018. The contents of which is hereby incorporated by reference.

FIELD OF USE

The present disclosure relates to a fastener including a transition zone and a method of using the fastener.

BACKGROUND

Aircraft and other structures can require numerous mechanical fasteners. For example, a fastener can be installed in a bore of an aircraft structural component to join individual elements. Failure of a fastener in a structural component can be a result of fatigue stresses on the fastener or geometric variations in the bore in which the fastener is disposed. In a bolted joint, the fastener can be sized to provide a clearance distance between a shank of the fastener and the bore to facilitate assembly. In an interference fit, a fastener can be configured to be secured to a structure by a friction fit between the fastener shank and an internal surface of the bore in which the fastener is disposed. The interference fit can produce residual compressive stress in the structure which can help to inhibit the formation of fatigue cracks originating from the bore.

Certain conventional fasteners secured in structures by an interference fit typically include a head, a cylindrical shank, and a threaded portion. The threaded portion can have an outer diameter that is smaller than a diameter of the shank. The threaded portion can be sized so that it can be readily inserted in a bore, followed by the shank, which has a diameter slightly larger than a diameter of the bore to thereby provide an interference fit between the shank and the bore. Similarly, the shank of a blind fastener can include a reduced diameter region which can readily pass into the bore and facilitate alignment of the fastener with the bore before installation.

Because the shank of an interference fit fastener forcefully contacts the internal surface of a bore into which it is installed, the design of the fastener can influence the strain imparted to structure into which the fastener is inserted. There is a need for an improved fastener design that inhibits imparting excessive forces to structures in which the fastener is installed.

SUMMARY

In one aspect, the present disclosure provides a fastener comprising a first end, an oppositely disposed second end, and an elongate portion. The elongate portion is intermediate the first end and the second end and defines a longitudinal axis of the fastener. The elongate portion comprises a generally cylindrical first region adjacent to the first end and a generally cylindrical second region adjacent to the second end. The first region extends a distance along the elongate portion and has a first diameter. The second region extends a distance along the elongate portion and has a second diameter different from the first diameter. The second region may comprise a threaded region, a generally smooth region, a grooved region, or combinations of two or more thereof. The fastener further comprises a transition zone extending a distance along the elongate portion and connecting the first region and the second region. The transition zone comprises a radiused region and a taper region. The radiused region comprises a shoulder defining a radius of curvature in a range of 0.0002 inch to 0.02 inch. The taper region comprises an angled surface defining an angle in a range of 2 degrees to 10 degrees relative to the longitudinal axis.

In another aspect, the present disclosure provides a method for fastening. The method comprises installing a second end of a fastener into a bore in a structure. The fastener comprises a first end, an oppositely disposed second end, and an elongate portion. The elongate portion is intermediate the first end and the second end and defines a longitudinal axis of the fastener. The elongate portion comprises a generally cylindrical first region adjacent to the first end and a generally cylindrical second region adjacent to the second end. The first region extends a distance along the elongate portion and has a first diameter. The second region extends a distance along the elongate portion and has a second diameter different from the first diameter. The second region may comprise a threaded region, a generally smooth region, a grooved region, or combinations of two or more thereof. The fastener further comprises a transition zone extending a distance along the elongate portion and connecting the first region and the second region. The transition zone comprises a radiused region and a taper region. The radiused region comprises a shoulder defining a radius of curvature in a range of 0.0002 inch to 0.02 inch. The taper region comprises an angled surface defining an angle in a range of 2 degrees to 10 degrees relative to the longitudinal axis. After inserting the second end of the fastener into the bore, the transition zone of the fastener is forcibly contacted with the internal wall of the bore by pressing and/or pulling the fastener into the bore. The fastener is secured within the bore by a friction fit between the first portion of the fastener and the bore.

It is understood that the invention disclosed and described in this specification is not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples, and the manner of attaining them, will become more apparent, and the examples will be better understood, by reference to the following description taken in conjunction with the accompanying drawings, wherein.

Corresponding reference characters indicate corresponding parts throughout the several views. The exemplifications set out herein illustrate certain embodiments, in one form, and such exemplifications are not to be construed as limiting the scope of the appended claims in any manner.

DETAILED DESCRIPTION OF NON-LIMITING EMBODIMENTS

Figure 1A:
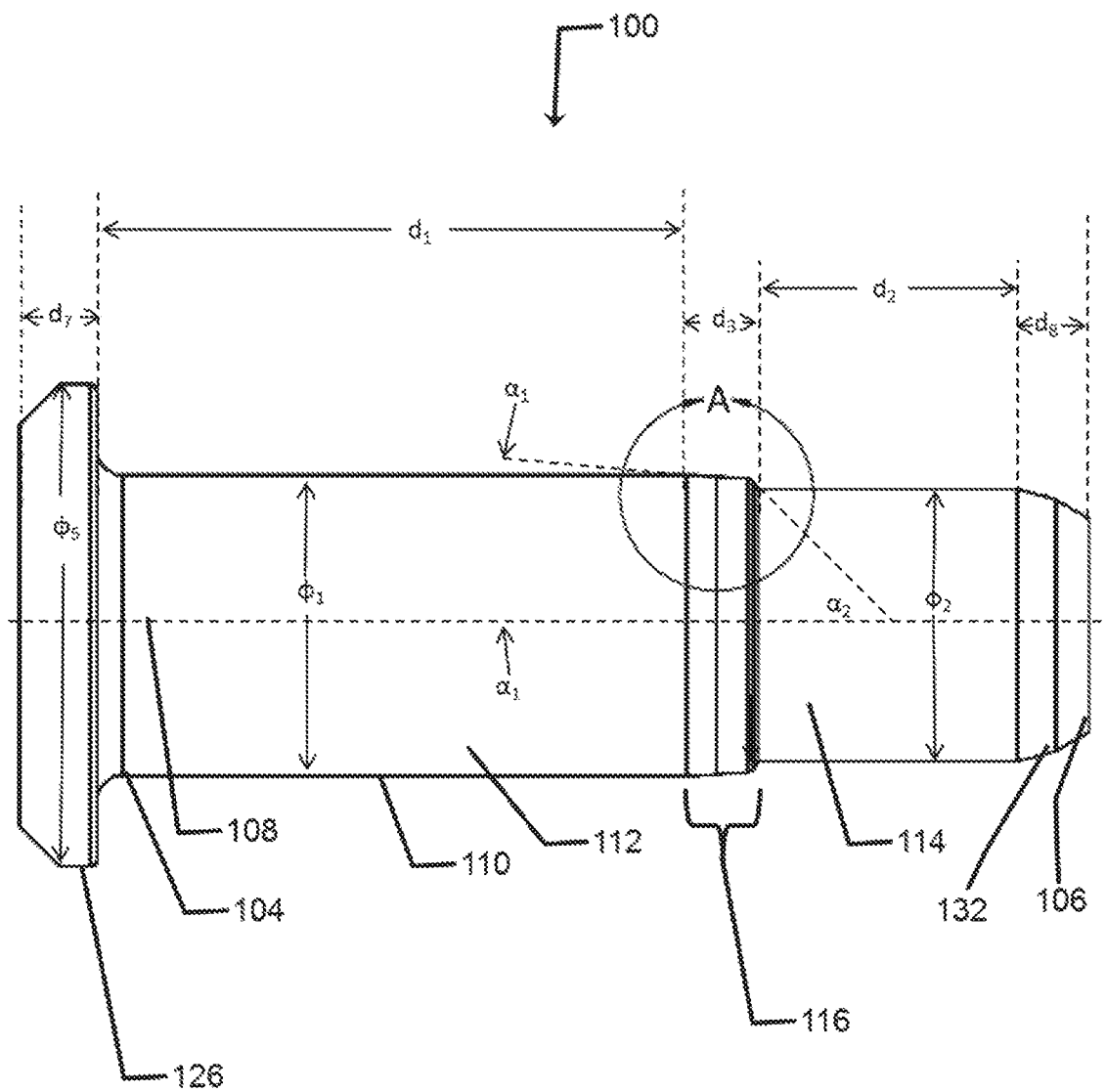
FIG. 1A is a side view of a non-limiting embodiment of a fastener according to the present disclosure including a transition zone.

Various examples are described and illustrated herein to provide an overall understanding of the structure, function, and use of the disclosed articles and methods. The various examples described and illustrated herein are non-limiting and non-exhaustive. Thus, the invention is not limited by the description of the various non-limiting and non-exhaustive examples disclosed herein. Rather, the invention is defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated herein by reference in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Any references herein to "various examples," "some examples," "one example," "an example", or like phrases, means that a particular feature, structure, or characteristic described in connection with the example is included in at least one example. Thus, appearances of the phrases "in various examples," "in some examples," "in one example", "in an example", or like phrases, in the specification do not necessarily refer to the same example. Furthermore, the particular described features, structures, or characteristics may be combined in any suitable manner in one or more examples. Thus, the particular features, structures, or characteristics illustrated or described in connection with one example may be combined, in whole or in part, with the features, structures, or characteristics of one or more other examples without limitation. Such modifications and variations are intended to be included within the scope of the present examples.

In this specification, unless otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a", "an", and "the", as used herein, are intended to include "at least one" or "one or more", unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural, and the use of a plural noun includes the singular, unless the context of the usage requires otherwise.

Metal alloys can experience damage due to fatigue. A composite material such as, for example, a carbon fiber reinforced composite material, can be less prone to fatigue damage than a metallic material. However, when a fastener is installed in a composite material using an interference fit, the high interface pressure between the fastener and the composite material can result in a significant reduction in contact resistance at the fastener-composite material interface. The reduction in contact resistance can reduce the ability of the fastener to dissipate lightning current and mitigate joule heating, reducing the fastener's ability to limit formation of microscopic plasma channels between an outside surface of the fastener and the structure.

In some fasteners, a transition zone can be positioned intermediate the fastener's shank portion and a reduced diameter region. The transition zone can include a simple taper angle or a single radius to transition the fastener's reduced diameter region into the larger diameter shank portion. Often, the size of the transition zone is minimized to reduce the length and/or weight of the fastener.

As used herein, "intermediate" means that the referenced element is disposed between two elements, but is not necessarily in contact with those elements. Accordingly, unless stated otherwise herein, an element that is "intermediate" a first element and a second element may or may not be adjacent to or in contact with the first and/or second elements, and other elements may be disposed between the intermediate element and the first and/or second elements.

To minimize the length of a transition zone, the largest possible taper angle can be used in the zone. The present inventors have observed that while a large transition zone taper angle can reduce overall length and weight of a fastener, the large angle can create a relatively high strain at the entrance and exit sides of the bore in the structure during fastener installation. High strains can result in a significant difference between the resultant residual stresses in the area of the structure adjacent to the entrance and/or exit side of the bore compared to an internal portion of the structure (e.g., mid-way thru the thickness of the structure).

A probability of damage to the structure can be related to the strain-to-failure of the structure (e.g., an intrinsic property). A structure comprising a material with a low strain-to-failure such as, for example, carbon fiber reinforced polymer composite, can be more susceptible to damage by stresses imparted during fastener installation. Furthermore, the resultant stress at the exit side of a bore can result in higher risk of stress corrosion.

In view of the above drawbacks, a fastener is provided with a transition zone that can reduce the strain at the entrance side and/or exit side of a bore during fastener installation. The reduction in strain can provide a balance between the resultant residual stresses at the entrance and/or exit sides of the bore and the internal region of the bore and thereby reduce the risk of damage to the structure during insertion of the fastener. According to certain embodiments, the fastener comprises a first end, an oppositely disposed second end, and an elongate portion. The elongate portion is intermediate the first end and the second end and defines a longitudinal axis of the fastener. The elongate portion comprises a generally cylindrical first region adjacent to the first end and a generally cylindrical second region adjacent to the second end. The first region can extend a distance along the elongate portion and has a first diameter. The second region extends a distance along the elongate portion and has a second diameter that differs from the first diameter. The second region may comprise threads, a generally smooth region, a grooved region, or combinations of two or more thereof. The fastener further comprises a transition zone extending a distance along the elongate portion, and the transition zone can connect the first region and the second region. The transition zone can comprise a radiused region and a taper region. The radiused region can comprise a shoulder defining a radius of curvature in a range of 0.0002 inch to 0.02 inch. The taper region can comprise an angled surface defining an angle in a range of 2 degrees to 10 degrees relative to the longitudinal axis.

Referring to FIG. 1A, a side view of a fastener 100 having a transition zone is provided. As illustrated, the fastener 100 includes a first end 104 and an oppositely disposed second end 106. An elongate portion 110 is disposed intermediate the first end 104 and the second end 106. The elongate portion 110 defines a longitudinal axis 108 of the fastener 100. In various embodiments, the elongate portion 110 is generally cylindrical. The elongate portion 110 comprises a first region 112, a second region 114, and a transition zone 116. The first portion 112 can be positioned adjacent to the first end 104 and extend a distance $d_1$ along the elongate portion 110. The second region 114 can be positioned adjacent to the second end 106 and extend a distance $d_2$ along the elongate portion 110.

Figure 2:
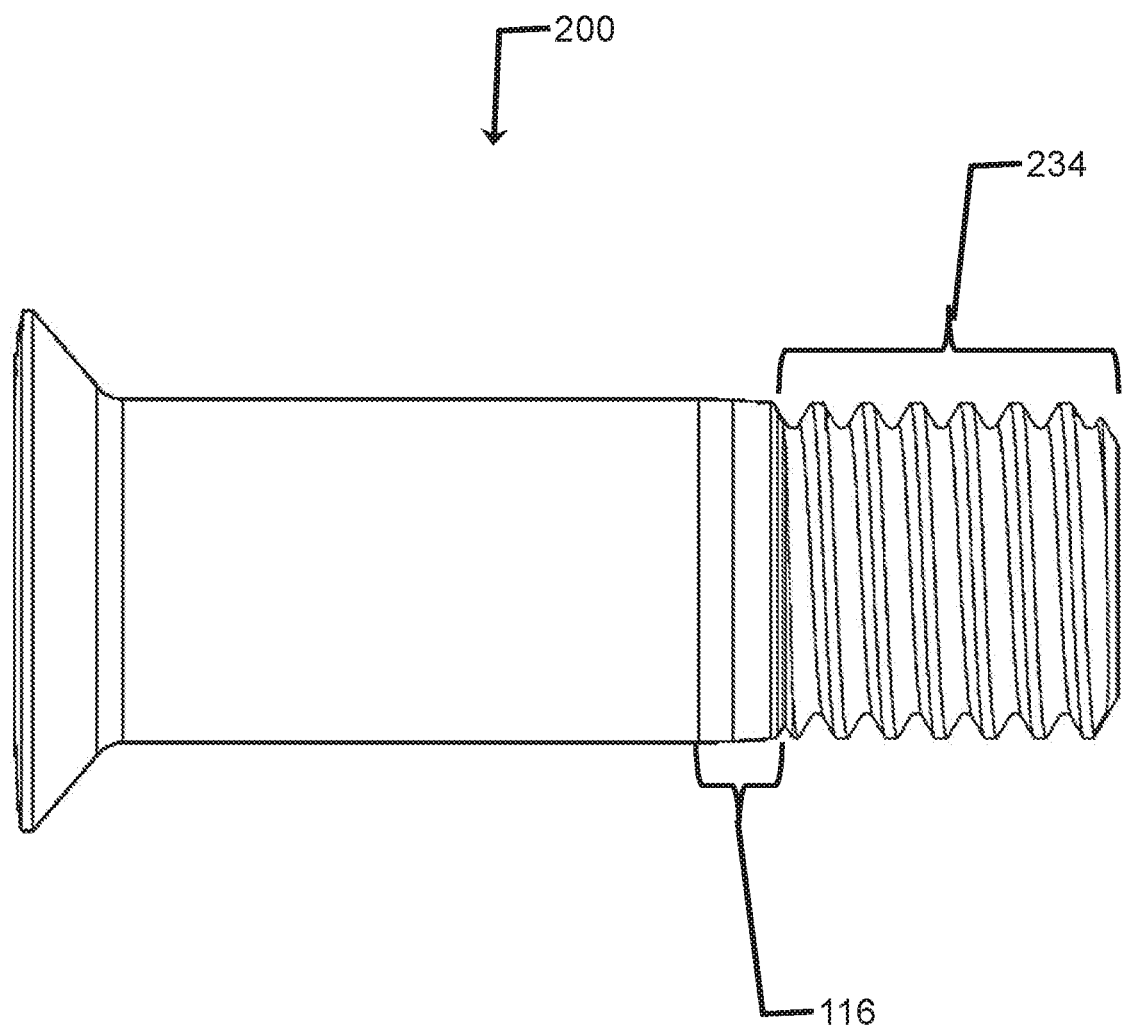
FIG. 2 is a side view of a non-limiting embodiment of a threaded fastener according to the present disclosure including the transition zone.
Figure 3:
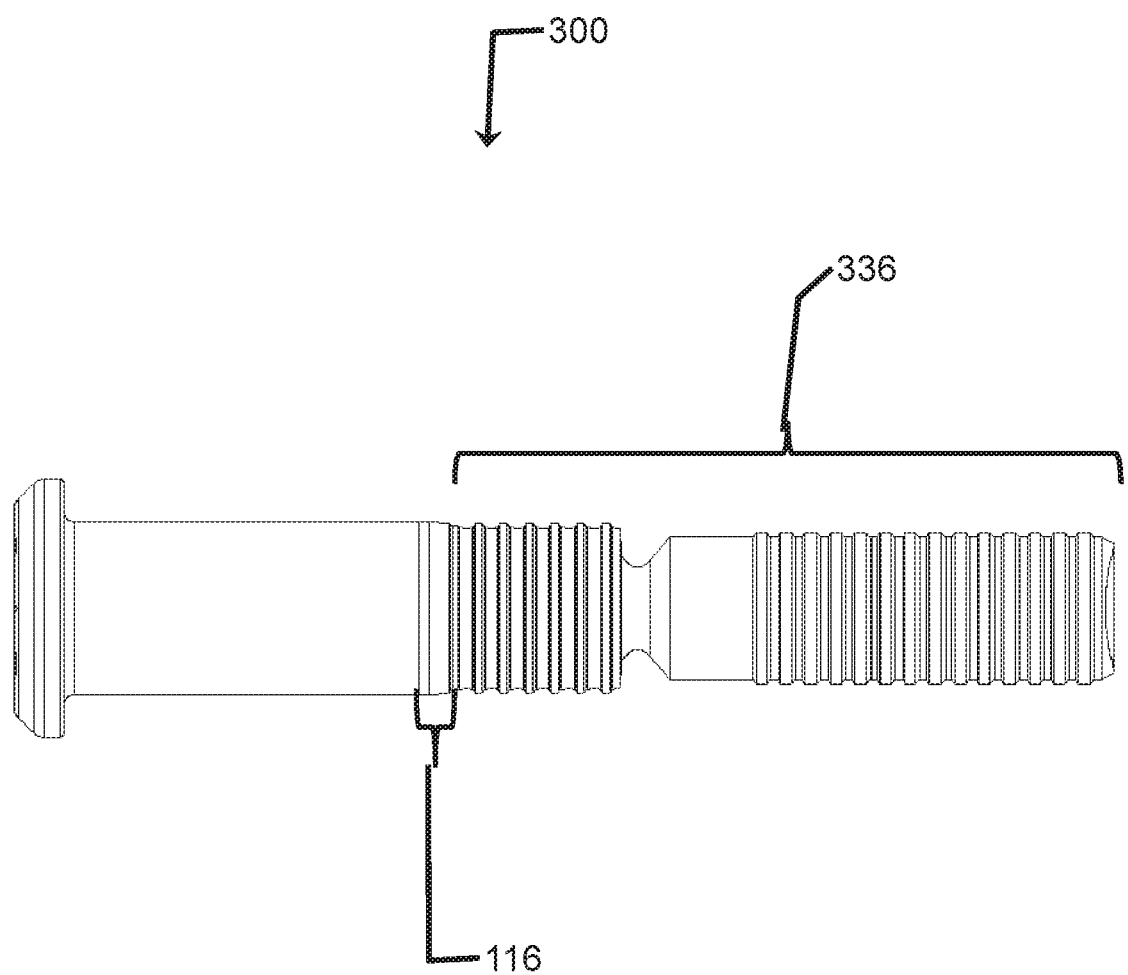
FIG. 3 is a side view of a non-limiting embodiment of a grooved fastener according to the present disclosure including the transition zone.

One or both of the first region 112 and the second region 114 can include a threaded region, a generally smooth region, a grooved region, or combinations of two or more of those regions. In various embodiments, one or both of the first region 112 and the second region 114 are generally cylindrical. In various embodiments, all or a portion of the second region 114 includes threads. For example, as shown in FIG. 2, the second region of threaded fastener 200 includes threaded region 234 and transition zone 116. In other embodiments, the second region 114 lacks threads. In various embodiments, all or a portion of the second region 114 includes grooves. For example, as shown in FIG. 3, the second region of grooved fastener 300 includes grooved region 336 and transition zone 116.

Figure 4:
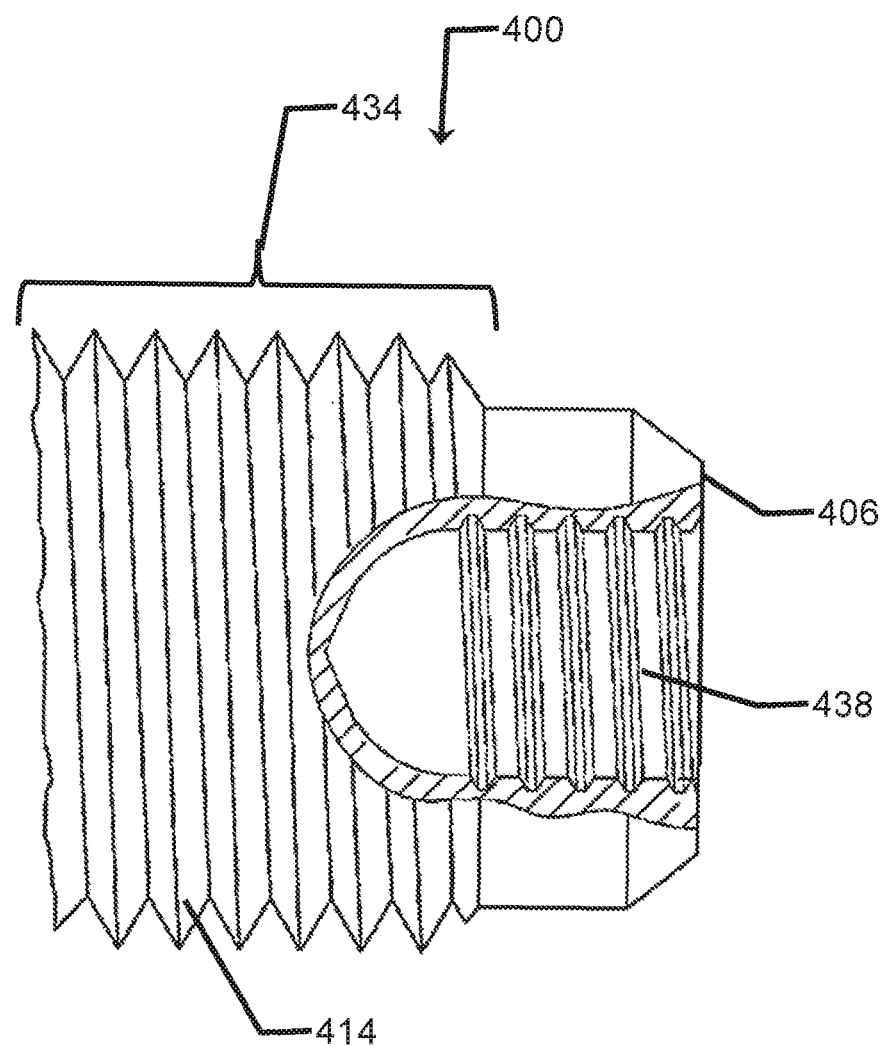
FIG. 4 is a schematic cutaway side view of a non-limiting embodiment of an internally threaded fastener according to the present disclosure.

In certain embodiments, the threaded region 234 and/or grooved region 336 can be external relative to the respective fastener 200, 300. In various other embodiments, the threaded region 234 and/or grooved region 336 can be internally disposed on the fastener. For example, as illustrated in FIG. 4, an internally threaded fastener 400 can comprise an internally threaded region 438 disposed within the second region 414 of the internally threaded fastener 400 and adjacent to the second end 406 of the internally threaded fastener 400. In various embodiments, the second region 114 can include either or both an internally threaded/grooved region and an externally threaded/grooved region. For example, internally threaded fastener 400 can include both an external threaded portion 434 and the internally threaded portion 438.

Referring again to FIG. 1, the first region 112 has a first diameter, $\varphi_1$, and the second region 114 has a second diameter, $\varphi_2$, which can be different than the first diameter, $\varphi_1$. In various embodiments, the second diameter, $\varphi_2$, is less than the first diameter, $\varphi_1$. In various embodiments, the first diameter, $\varphi_1$, can be in a range of 0.06 inch to 4 inches such as, for example, 0.125 inch to 2 inch or 0.248 inch to 0.250 inch. In various embodiments, the second diameter, $\varphi_1$, can be in a range of 0.05 inch to 3.9 inches such as, for example, 0.115 inch to 1.99 inch or 0.225 inch to 0.227 inch.

Figure 1B:
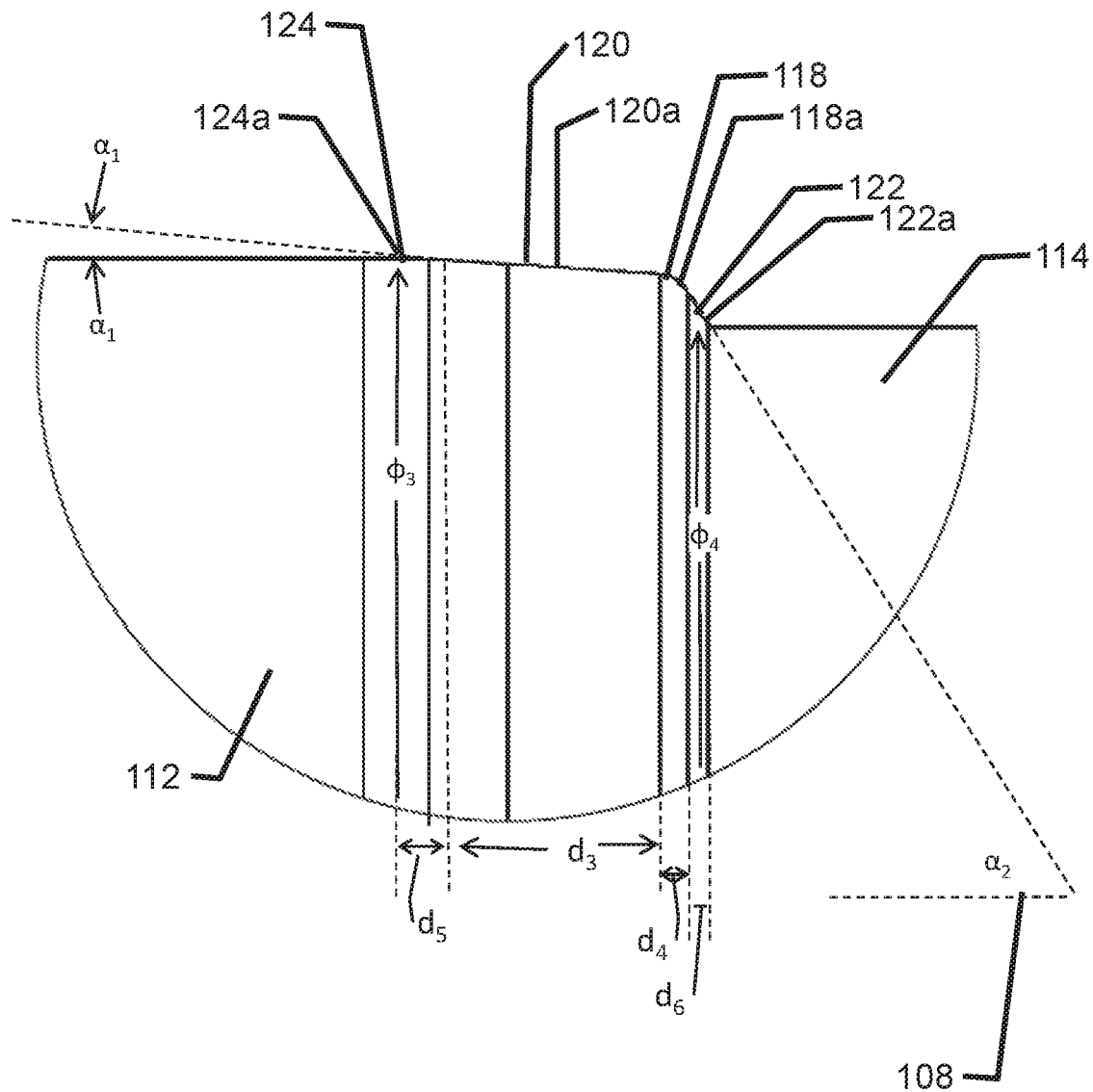
FIG. 1B is a detail view of area A in FIG. 1A illustrating the transition zone.

The transition zone 116 of fastener 100 extends a distance $d_3$ along the elongate portion 110 and connects the first region 112 and the second region 114. The transition zone 116 transitions the diameter of the fastener from the first diameter, $\varphi_1$, to the second diameter, $\varphi_2$. In certain embodiments, the transition zone 116 can have a variable diameter including a third diameter, $\varphi_3$, substantially similar to the first diameter, $\varphi_1$, proximal to the first region 112, and a fourth diameter, $\varphi_4$, substantially similar to the second diameter, $\varphi_2$, proximal to the second region 114. FIG. 1B is a detailed view of region "A" in FIG. 1A and shows an embodiment of a transition zone 116. On traversing the transition zone 116 in a direction of the longitudinal axis 108, the diameter of the transition zone 116 can vary from the third diameter, $\varphi_3$, to the smaller fourth diameter, $\varphi_4$, thereby connecting the first region 112 to the second region 114. In various embodiments, upon traversing the transition zone 116 in a direction of the longitudinal axis 108, an angle of curvature of the transition zone 116 can change. For example, the transition zone can be hyperbolic. In various embodiments, the transition zone 116 has a shape of a portion of a hyperboloid.

The transition zone 116 can facilitate an interference fit installation of the fastener 100 into a bore in a structure. For example, the second end 106 of the fastener 100 can be inserted initially into the bore. To facilitate alignment of the fastener 100 with the bore, the bore can have a diameter $\varphi_b$ that is greater than the second diameter, $\varphi_2$, of the second region 114, thereby allowing the second region to readily pass into the bore. To provide an interference fit installation of the fastener 100, the bore diameter, $\varphi_b$, can be less than the first diameter, $\varphi_1$, of the first region 112. After passage of the second region 114 unimpeded through the bore, the transition zone 116 forcibly contacts an entrance side of the bore. As the transition zone 116 passes into the bore, the configuration of the transition zone 116 can limit axial stress applied to the structure and facilitate a secure interference fit between the bore wall and the first region 112, without imparting problematic stress to the structural region adjacent the bore.

In various examples, the structure in which the fastener is installed comprises a metal, a metal alloy, a composite, or combinations of any of those materials. For example, the structure can comprise aluminum, an aluminum alloy, titanium, a titanium alloy, nickel, a nickel alloy, iron, an iron alloy, stainless steel, a stainless steel alloy, steel, and a steel alloy, a composite material, or combinations of any of those materials. In various embodiments, the structure comprises 7075 aluminum. In various examples, the structure can comprise carbon fiber reinforced composite material. In various examples, the structure can be an aircraft part such as an aircraft frame.

Referring again to FIG. 1B, the transition zone 116 can comprise a radiused region 118 and a taper region 120. The taper region 120 can extend a distance $d_3$ along the elongate portion 110 and can be positioned intermediate the first region 112 and the radiused region 118. The taper region 120 includes an angled surface 120a which defines an angle $\alpha_1$ that is in a range of 2 degrees to 10 degrees relative to the longitudinal axis 108. In certain embodiments, the angle can be 2 degrees to 7 degrees, 3 degrees to 5 degrees, or 4 degrees. In the embodiment shown as fastener 100, as one moves along the taper region 120 away from the first portion 112, the diameter of the elongate potion 110 decreases. In various examples, the taper region 120 can have a shape of a portion of a cone such as, for example, a conical frustum. The taper region 120 has a progressive reduction in diameter along the longitudinal axis 108. In various embodiments, a line disposed along the taper region 120 can be, but is not necessarily, a flat surface.

As shown in FIG. 1B, the radiused region 118 can extend a distance $d_4$ along the elongate portion 110 and can be positioned intermediate the taper region 120 and the second portion 114. The radiused region 118 can include a shoulder that defines a radius of curvature in a range of 0.0002 inch to 0.02 inch, such as for example, 0.001 inch to 0.009 inch, or 0.006 inch. In the embodiment shown as fastener 100, as one moves along the radiused region 118 away from the first region 112, the diameter of the elongate potion 110 decreases. In various examples, the radiused region 118 can have a surface 118a which is convex. In various examples, the surface 118a has a curvature greater than 0. In various examples, a chord along the surface 118a can have the radius, $r_1$.

In various embodiments, the transition zone 116 can comprise a second radiused region 124 and a second taper region 122. The second radiused region 124 can extend a distance $d_5$ along the elongate portion 110 and can be positioned intermediate the first region 112 and the tapered region 120. The second radiused region 124 can be configured to include a surface defining a radius of curvature in a range of 0.1 inch to 1 inch, such as for example, 0.1 inch to 0.8 inch, 0.35 to 0.5 inch, or 0.350 inch. For example, as the second radiused region 124 extends away from the first region 112, the diameter of the second radiused region 124 can decrease. In various examples, the second radiused region 124 can have a surface 124a that is convex with respect to the elongate portion 110. In various examples, the surface 124a has a curvature greater than 0. In various examples, a chord along the surface 124a can have the radius $r_2$.

The second taper region 122 can extend a distance $d_6$ along the elongate portion 110 and can be positioned intermediate the radiused region 118 and the second region 114. The second taper region 122 has a surface 122a which defines an angle $\alpha_2$ in a range of 30 degrees to 70 degrees relative to the longitudinal axis 108, such as 45 degrees to 65 degrees, or 60 degrees. For example, as the second taper region 122 extends away from the radiused region 118 and toward the second end 106, the diameter of the second taper region 122 can decrease. In various examples, the second taper region 122 can include a chamfer. In various examples, the second taper region 122 can have a shape of a portion of a cone such as, for example, a conical frustum.

In various embodiments, the fastener 100 can comprise a head portion 126 positioned adjacent to the first end 104. The head portion 126 can extend a distance $d_7$ along the longitudinal axis 108 of the fastener 100. In various examples, the distance $d_7$ can be in a range of 0.01 inch to 2 inches such as, for example, 0.02 inch to 1 inch, or 0.063 inch to 0.065 inch. The head portion 126 can be configured to engage a tool in order to facilitate installation of the fastener 100. The head portion 126 can be configured with a fifth diameter, $\varphi_5$, which in various examples can be larger than the first diameter, $\varphi_1$. In various examples, the fifth diameter, $\varphi_5$, can be in a range of 0.06 inch to 4.5 inches such as, for example, 0.116 inch to 2.5 inch, or 0.39 inch to 0.41 inch. Upon installation of the elongate portion 110 into a bore in a structure, the head portion 126 can engage the structure at the entrance side of the bore and limit further axial movement of the fastener in to the bore.

In various embodiments, the fastener 100 can comprise an alignment region 132 which can extend a distance $d_8$ along the elongate portion 110 and can be positioned adjacent to the second end 106. The distance $d_8$ can be in a range of 0.01 inch to 1 inch such as, for example, 0.02 inch to 0.25 inch, or 0.058 inch to 0.060 inch. The alignment region 132 can facilitate the alignment of the fastener 100 with the bore in the structure. For example, the alignment region 132 can be configured with a tapered surface and/or a radiused surface with a variable diameter.

In various embodiments, the fastener 100 can be a threaded pin, a lockbolt, a bolt, or a blind fastener. In various embodiments, the fastener 100 can be an interference fit fastener. In various embodiments, the fastener 100 can comprise a material selected from, for example, aluminum, an aluminum alloy, titanium, a titanium alloy, nickel, a nickel alloy, iron, an iron alloy, stainless steel, a stainless steel alloy, steel, and a steel alloy, and combinations of any of those materials.

In various embodiments, the fastener 100 can be used in a method for fastening a structure. The method includes inserting the second end 106 and the second region 114 of the fastener 100 into a bore in the structure. Subsequent to inserting the second end 106 and second region 114 into the bore, the transition zone 116 of the fastener 100 can forcibly contact the wall of the bore by pressing the fastener 100 and/or pulling the fastener 100 to advance it further into the bore. The pressing and/or pulling can be facilitated by the use of any suitable tool, such as for example, a hammer, a press, or a puller. The fastener 100 can be secured within the bore by a friction fit between the first region 110 of the fastener 100 and the bore. In various examples wherein the fastener 100 comprises a head portion 126, upon installation of the fastener 100 fully into the bore, the head portion 126 can contact the structure and limit the further movement of the fastener 100 into the bore.

The present inventors have observed that a fastener including a transition zone as generally described herein can reduce the insertion load required to install the fastener into the bore of the structure, thereby facilitating installation of the fastener and/or inhibiting damage to the structure in the vicinity of the bore. More particularly, the design of the fastener 100 can inhibit damage to an aircraft structure during assembly in to a bore in the structure. For example, the design of the fastener 100 can reduce the risk of delamination of a composite material such as, for example, a carbon fiber reinforced composite material, in which the fastener 100 is installed. Moreover, the fastener 100 can limit stress corrosion damage in an aircraft structure. For example, the fastener 100 can minimize surface defects induced by installation of the fastener 100 into the bore. The reduction in surface defects can enhance operational life of the structure and inhibit the occurrence of corrosion fatigue at a joint. Also, the reduction in surface defects can enhance electrical conductivity between the fastener 100 and the structure in which it is installed, which can reduce damage from a lightning strike.

Examples

Examples of fasteners are provided in Table 1 herein. The dimensions listed in Table 1 correspond to the dimensions indicated in FIGS. 1A and 1B. The dimensions in Table 1 are for illustrative purposes only and should not be considered limiting.

TABLE 1

| Fastener dimensions | | | | | | |
|---|---|---|---|---|---|---|
| Fastener ID | $\varphi_1$ (in) | $\varphi_2$ (in) | $r_1$ (in) | $r_2$ (in) | $\alpha_1$ (°) | $\alpha_2$ (°) |
| B | .249 | .226 | N/A | N/A | N/A | 60 |
| 1 | .249 | .226 | .006 | .350 | 4 | 60 |

Experimental fastener ID-1 includes a transition zone according to the present disclosure, while baseline fastener ID-B does not include a transition zone according to the present disclosure. Fastener ID-1 can reduce the insertion load required to install the fastener into a bore of a structure relative to the insertion load required to install the baseline fastener ID-B. For example, baseline fastener ID-B and experimental fastener ID-1 were installed in a 0.245 inch bore of a 7075 aluminum sheet having a thickness of 0.25 inch utilizing a fatigue machine. For each fastener tested, the installation included positioning an end of the fastener into the bore and aligning the longitudinal axis of each fastener with a central axis of the bore. Thereafter, the fatigue machine was positioned in contact with the fastener head and the fatigue machine was initialized. The fatigue machine applied an axial load to the fastener, causing the fastener to move into the bore. As the fastener moved into the bore, the transition zone of the fastener contacted the 7075 aluminum sheet at the bore walls, and the fastener then moved further into the bore until a head portion of the fastener contacted an entrance side of the bore. To fully install the fastener, the fastener had to travel at least 0.25 inch with respect to the 7075 aluminum sheet. The applied load from the fatigue machine was recorded as a function of the deflection of the fastener (i.e., the distance the fastener moved through the bore as measured along the fastener's longitudinal axis).

Figure 5:
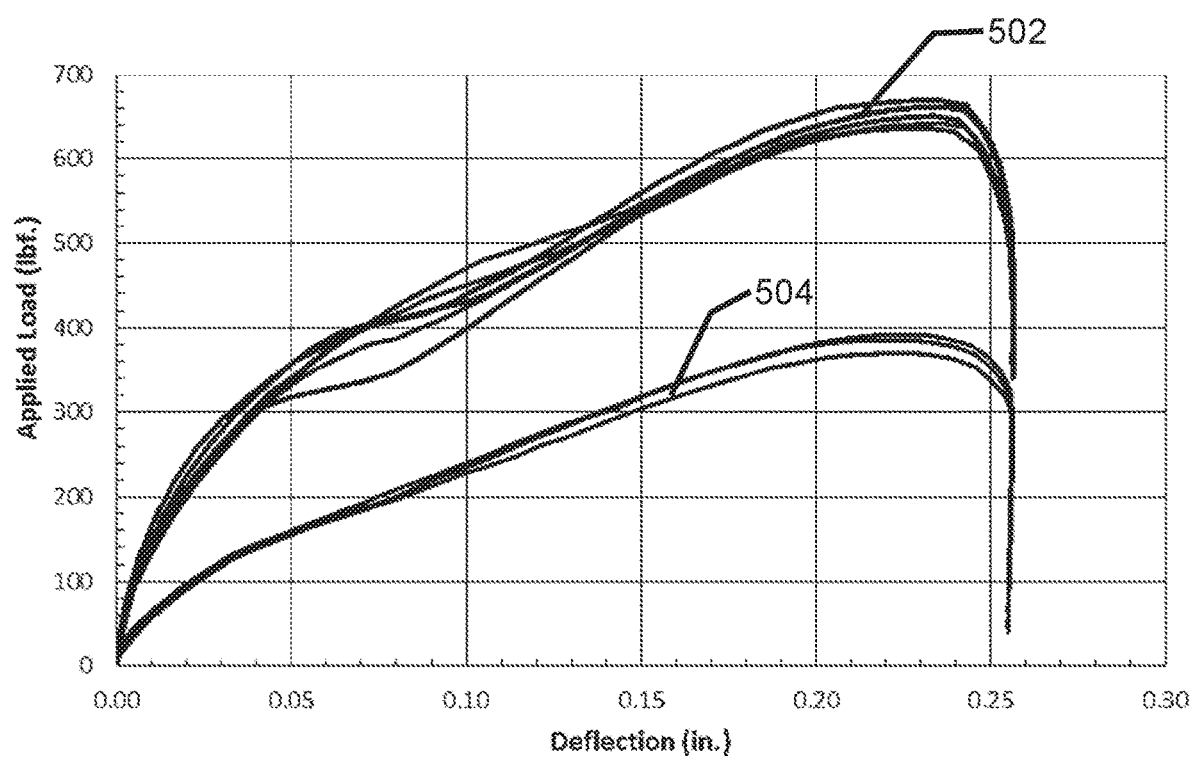
FIG. 5 is a graph illustrating a relationship between an applied load and deflection for installation of a baseline fastener ID-B and a fastener ID-1.

The installation of baseline fastener ID-B was performed six times utilizing six fasteners with the same design and six bores. For each installation of the baseline fastener ID-B, the applied load from the fatigue machine was plotted as a function of deflection, and the resulting six curves are included in grouping 502 in FIG. 5. As shown in FIG. 5, installing each baseline fastener ID-B into a bore in the 7075 aluminum sheet required a maximum applied load greater than 630 pounds force (lbf).

The installation of experimental fastener ID-1 was performed three times utilizing three fasteners with the same design and three bores. For each installation of experimental fastener ID-1, the applied load from the fatigue machine was plotted as a function of deflection, and the resulting curves are included in grouping 504 in FIG. 5. As shown in FIG. 5, installing each experimental fastener ID-1 into a bore in the 7075 aluminum sheet required a maximum applied load less than 400 lbf. Accordingly, installing experimental fastener ID-1 in the 7075 aluminum sheet required at least 35% less applied load than needed to install baseline fastener ID-B in a bore of the same dimension in the same structure.

Figure 6:
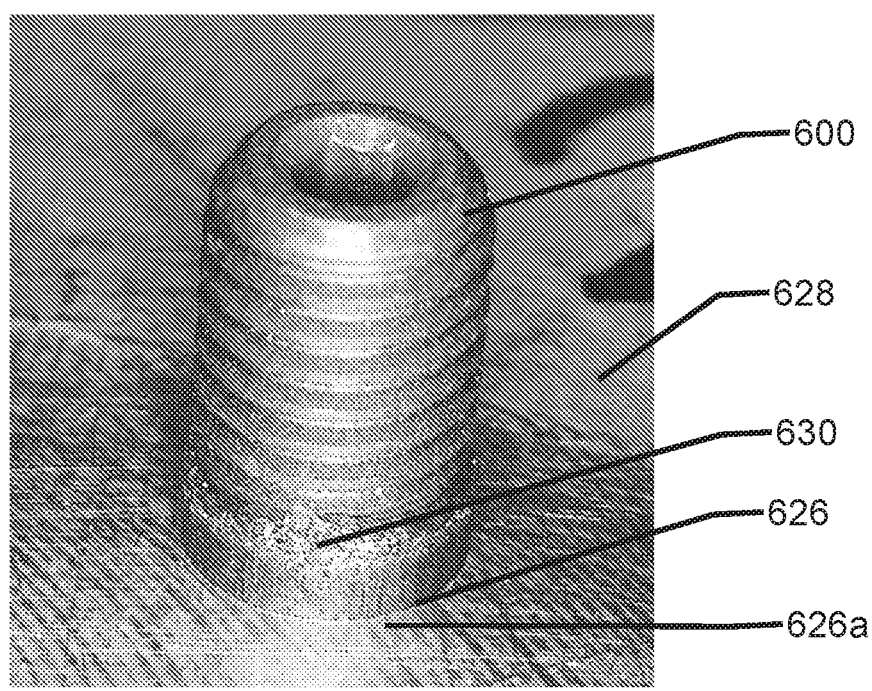
FIG. 6 is a photograph of the baseline fastener ID-B installed in a bore in a 7075 aluminum structure.

The reduced applied load needed to install experimental fastener ID-1 resulted in less damage to the entrance side and exit side of the bore in the 7075 aluminum sheet with an interference fit. FIG. 6 is a photograph of a baseline fastener ID-B 600 installed in a bore 626 in a 0.25 inch thick 7075 aluminum sheet 628. Prior to installation of the fastener 600, the bore 626 prior had an internal diameter of 0.245 inch. As shown in FIG. 6, installation of the baseline fastener ID-B 600 resulted in some degree of damage to the 7075 aluminum sheet 628. Namely, the baseline fastener ID-B 600 deformed the exit side 626a of the bore 626, and material 630 sheared from the walls of bore 626 by the fastener 600 is visible on the fastener 600. The operational life of the baseline fastener ID-B may be negatively affected by damage to the aluminum sheet 628 in the vicinity of the bore 626.

Figure 7:
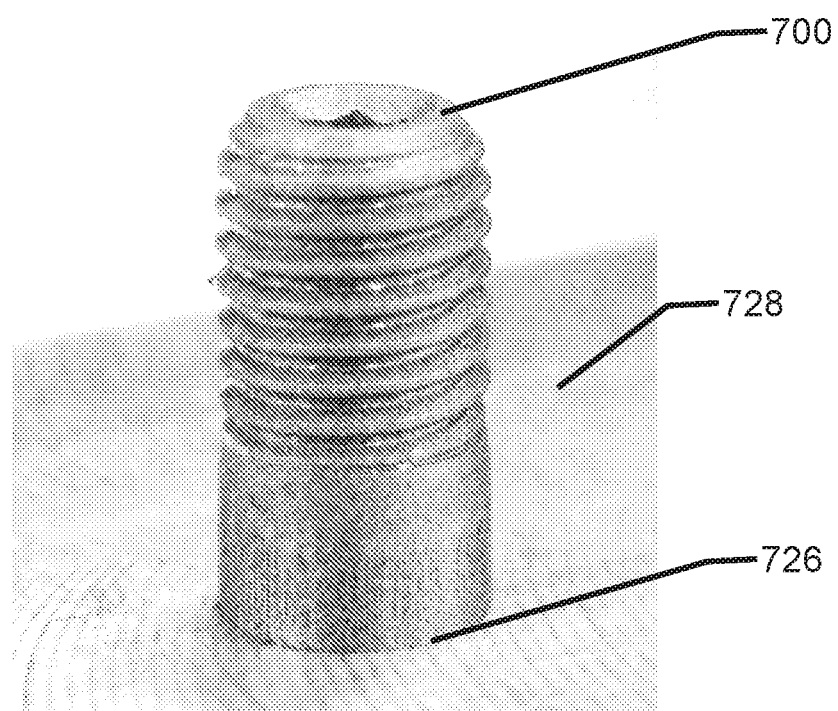
FIG. 7 is a photograph of the fastener ID-1 installed into a bore in a 7075 aluminum structure.

FIG. 7 is a photograph of an experimental fastener ID-1 700 installed in a bore 726 in a 0.25 inch thick 7075 aluminum sheet 728 with an interference fit. Prior to installation of the fastener 700 in the bore 726, the bore 726 had an internal diameter of 0.245 inch. As shown in FIG. 7, installation of fastener ID-1 700 has not damaged the 7075 aluminum sheet 728. More specifically, the fastener ID-1 700 has not damaged the exit side 726a of the bore 726 and no material is shown to have been sheared from the walls of the bore 726 through the installation. It is believed that the reduced damage to the 7075 aluminum sheet resulting form installation of the experimental fastener ID-1 700 relative to the installation illustrated in FIG. 6 can enhance the operational life of the fastener.

ASPECTS OF THE INVENTION

Various aspects of the invention include, but are not limited to, the aspects listed in the following numbered clauses.

1. A fastener comprising:
   a first end,
   an oppositely disposed second end, and
   an elongate portion intermediate the first end and the second end and defining a longitudinal axis of the fastener, wherein the elongate portion comprises:
      a generally cylindrical first region adjacent to the first end, extending a distance along the elongate portion and having a first diameter;

a generally cylindrical second region adjacent to the second end, extending a distance along the elongate portion and having a second diameter different from the first diameter; and a transition zone extending a distance along the elongate portion and connecting the first region and the second region, the transition zone comprising a radiused region comprising a shoulder defining a radius of curvature in a range of 0.0002 inch to 0.02 inch, and a taper region comprising an angled surface defining an angle in a range of 2 degrees to 10 degrees relative to the longitudinal axis.

2. The fastener of clause 1, wherein the second diameter is less than the first diameter.

3. The fastener of clause 1, and/or 2, wherein the taper region extends a distance along the elongate portion in a range of 0.031 inch to 0.062 inch.

4. The fastener of clause 1, 2, and/or 3, wherein the taper region is intermediate the first region and the radiused region.

5. The fastener of clause 1, 2, 3, and/or 4, wherein the transition zone is hyperbolic.

6. The fastener of clause 1, 2, 3, 4, and/or 5, wherein the taper region comprises a shape of a portion of a cone.

7. The fastener of clause 1, 2, 3, 4, 5, and/or 6, wherein the taper region includes an angled surface defining an angle in a range of 2 degrees to 7 degrees relative to the longitudinal axis.

8. The fastener of clause 1, 2, 3, 4, 5, 6, and/or 7, wherein the shoulder defines a radius of curvature in a range of 0.001 inch to 0.009 inch.

9. The fastener of clause 1, 2, 3, 4, 5, 6, 7, and/or 8, wherein the taper region is a first taper region and the transition zone further comprises:

a second taper region includes an angled surface defining an angle in a range of 30 degrees to 70 degrees relative to the longitudinal axis.

10. The fastener of clause 1, 2, 3, 4, 5, 6, 7, 8, and/or 9, wherein the radiused region is intermediate the first taper region and the second taper region.

11. The fastener of clause 1, 2, 3, 4, 5, 6, 7, 8, 9, and/or 10, wherein the radiused region is a first radiused region and the transition zone further comprises:

a second radius region comprising a shoulder defining a radius of curvature in a range of 0.1 to 1 inch.

12. The fastener of clause 1, 2, 3, 4, 5, 6, 7, 8, 9, 10, and/or 11, wherein the tapered region is intermediate the first radiused region and the second radiused region.

13. The fastener of clause 1, 2, 3, 4, 5, 6, 7, 8, 9, 10, 11, and/or 12, where the fastener is selected from the group consisting of a threaded pin, a lockbolt, a bolt, and a blind fastener.

14. The fastener of clause 1, 2, 3, 4, 5, 6, 7, 8, 9, 10, 11, 12, and/or 13, wherein the second region comprises at least one of threads and a groove.

15. The fastener of clause 1, 2, 3, 4, 5, 6, 7, 8, 9, 10, 11, 12, 13, and/or 14, wherein the fastener is an interference fit fastener.

16. The fastener of clause 1, 2, 3, 4, 5, 6, 7, 8, 9, 10, 11, 12, 13, 14, and/or 15, wherein the fastener comprises a material selected from the group consisting of aluminum, an aluminum alloy, titanium, a titanium alloy, nickel, a nickel alloy, iron, an iron alloy, stainless steel, a stainless steel alloy, steel, and a steel alloy.

17. The fastener of clause 1, 2, 3, 4, 5, 6, 7, 8, 9, 10, 11, 12, 13, 14, 15, and/or 16, wherein the second diameter is less than the first diameter, and wherein the fastener is adapted to be installed in a bore in a structure, the bore having a diameter greater than the second diameter.

18. The fastener of clause 1, 2, 3, 4, 5, 6, 7, 8, 9, 10, 11, 12, 13, 14, 15, 16, and/or 17, wherein the structure comprises at least one of a metal and a metal alloy.

19. The fastener of clause 1, 2, 3, 4, 5, 6, 7, 8, 9, 10, 11, 12, 13, 14, 15, 16, 17, and/or 18, wherein the structure comprises at least one of aluminum, an aluminum alloy, titanium, a titanium alloy, stainless steel, a stainless steel alloy, steel, a steel alloy, and a composite material.

20. The fastener of clause 1, 2, 3, 4, 5, 6, 7, 8, 9, 10, 11, 12, 13, 14, 15, 16, 17, 18, and/or 19, wherein the structure comprises 7085 aluminum alloy.

21. The fastener of clause 1, 2, 3, 4, 5, 6, 7, 8, 9, 10, 11, 12, 13, 14, 15, 16, 17, 18, 19, and/or 20, wherein the structure is an aircraft part.

22. The fastener of clause 1, 2, 3, 4, 5, 6, 7, 8, 9, 10, 11, 12, 13, 14, 15, 16, 17, 18, 19, 20, and/or 21, wherein the structure comprises a carbon fiber reinforced composite material.

23. The fastener of clause 1, 2, 3, 4, 5, 6, 7, 8, 9, 10, 11, 12, 13, 14, 15, 16, 17, 18, 19, 20, 21, and/or 22, wherein the second region comprises at least one of internal threads and external threads.

24. A fastener comprising:
a first end;
an oppositely disposed second end; and
an elongate portion intermediate the first end and the second end and defining a longitudinal axis of the fastener, wherein the elongate portion comprises a generally cylindrical first region adjacent to the first end, extending a distance along the elongate portion, and having a first diameter, a generally cylindrical second region adjacent to the second end, extending a distance along the elongate portion, and having a second diameter less than the first diameter, the second region comprises threads and a transition zone extending a distance along the elongate portion and connecting the first portion and the second portion, the transition zone comprising a radiused region comprising a shoulder defining a radius of curvature in a range of 0.0002 inch to 0.02 inch, and a taper region comprising an angled surface defining an angle in a range of 2 degrees to 10 degrees relative to the longitudinal axis, wherein the taper region is intermediate the first region and the radiused region.

25. A method for fastening, the method comprising:
inserting a second end of the fastener of clauses 1, 2, 3, 4, 5, 6, 7, 8, 9, 10, 11, 12, 13, 14, 15, 16, 17, 18, 19, 20, 21, 22, 23, and/or 24 into a/the bore in a/the structure;

forcibly contacting the transition zone of the fastener with the bore by at least one of pressing the fastener and pulling the fastener; and securing the fastener within the bore by a friction fit between the first region of the fastener and the bore.

One skilled in the art will recognize that the herein described components, devices, operations/actions, and objects, and the discussion accompanying them, are used as examples for the sake of conceptual clarity and that various configuration modifications are contemplated. Consequently, as used herein, the specific examples/embodiments set forth and the accompanying discussion are intended to be representative of their more general classes. In general, use of any specific exemplar is intended to be representative of its class, and the non-inclusion of specific components, devices, operations/actions, and objects should not be taken limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed, and not as more narrowly defined by particular illustrative aspects provided herein.

What is claimed is:

1. A fastener comprising:
   a first end;
   an oppositely disposed second end; and
   an elongate portion intermediate the first end and the second end and defining a longitudinal axis of the fastener, wherein the elongate portion comprises
      a generally cylindrical first region adjacent to the first end, extending a distance along the elongate portion, and having a first diameter,
      a generally cylindrical second region adjacent to the second end, extending a distance along the elongate portion, and having a second diameter different from the first diameter, and
      a transition zone extending a distance along the elongate portion and connecting the first portion and the second portion, the transition zone comprising
         a first radiused region comprising a shoulder defining a radius of curvature in a range of 0.0002 inch to 0.02 inch,
         a second radiused region comprising a shoulder defining a radius of curvature in a range of 0.1 to 1 inch,
         a first taper region comprising an angled surface defining an angle in a range of 2 degrees to 10 degrees relative to the longitudinal axis, and
         a second taper region comprising an angled surface defining an angle in a range of 30 degrees to 70 degrees relative to the longitudinal axis, wherein the first radiused region is positioned intermediate the first taper region and the second taper region, and wherein the second radiused region is intermediate the first taper region and the first region.

2. The fastener of claim 1, wherein the second diameter is less than the first diameter.

3. The fastener of claim 2, wherein the first taper region extends a distance along the elongate portion in a range of 0.031 inch to 0.062 inch.

4. The fastener of claim 2, wherein the first taper region is intermediate the first region and the first radiused region.

5. The fastener of claim 1, wherein the first taper region comprises a shape of a portion of a cone.

6. The fastener of claim 1, wherein the first taper region comprises an angled surface defining an angle in a range of 2 degrees to 7 degrees relative to the longitudinal axis.

7. The fastener of claim 1, wherein the shoulder of the first radiused region defines a radius of curvature in a range of 0.001 inch to 0.009 inch.

8. The fastener of claim 1, wherein the shoulder of the second radiused region defines a radius of curvature in a range of 0.1 to 0.8 inch.

9. The fastener of claim 8, wherein the first taper region is intermediate the first radiused region and the second radiused region.

10. The fastener of claim 1, wherein the fastener is selected from the group consisting of a threaded pin, a lockbolt, a bolt, and a blind fastener.

11. The fastener of claim 1, wherein the second region comprises at least one of threads and a groove.

12. The fastener of claim 1, wherein the second diameter is less than the first diameter, and wherein the fastener is adapted to be installed in a bore in a structure, the bore having a diameter greater than the second diameter.

13. The fastener of claim 12, wherein the structure is an aircraft part.

14. The fastener of claim 1, wherein the second region comprises at least one of internal threads and external threads.

15. A fastener comprising:
   a first end;
   an oppositely disposed second end; and
   an elongate portion intermediate the first end and the second end and defining a longitudinal axis of the fastener, wherein the elongate portion comprises
      a generally cylindrical first region adjacent to the first end, extending a distance along the elongate portion, and having a first diameter,
      a generally cylindrical second region adjacent to the second end, extending a distance along the elongate portion, and having a second diameter less than the first diameter, the second region comprises threads and
      a transition zone extending a distance along the elongate portion and connecting the first portion and the second portion, the transition zone comprising
         a first radiused region comprising a shoulder defining a radius of curvature in a range of 0.0002 inch to 0.02 inch,
         a second radiused region comprising a shoulder defining a radius of curvature in a range of 0.1 to 1 inch,
         a first taper region comprising an angled surface defining an angle in a range of 2 degrees to 10 degrees relative to the longitudinal axis, wherein the taper region is intermediate the first region and the radiused region, and
         a second taper region comprising an angled surface defining an angle in a range of 30 degrees to 70 degrees relative to the longitudinal axis, wherein the radiused region is positioned intermediate the first taper region and the second taper region, and wherein the second radiused region is positioned intermediate the first taper region and the first region.

16. A method for fastening, the method comprising:
   inserting a second end of a fastener into a bore in a structure, the fastener including
      a first end,
      the second end disposed opposite the first end, and
      an elongate portion intermediate the first end and the second end and defining a longitudinal axis of the fastener, wherein the elongate portion comprises
         a generally cylindrical first region adjacent to the first end, extending a distance along the elongate portion, and having a first diameter,
         a generally cylindrical second region adjacent to the second end, extending a distance along the elongate portion, and having a second diameter different from the first diameter, and a transition zone extending a distance along the elongate portion and connecting the first region and the second region, the transition zone comprising
- a first radiused region comprising a shoulder defining a radius of curvature in a range of 0.0002 inch to 0.02 inch,
- a second radiused region comprising a shoulder defining a radius of curvature in a range of 0.1 to 1 inch,
- a first taper region comprising an angled surface defining an angle in a range of 2 degrees to 10 degrees relative to the longitudinal axis, and
- a second taper region comprising an angled surface defining an angle in a range of 30 degrees to 70 degrees relative to the longitudinal axis, wherein the radiused region is positioned intermediate the first taper region and the second taper region, and wherein the second radiused region is positioned intermediate the first taper region and the first region;

after inserting, forcibly contacting the bore with the transition zone of the fastener by at least one of pressing the fastener and pulling the fastener; and securing the fastener within the bore by a friction fit between the first region of the fastener and the bore.

17. The method of claim 16, further comprising inhibiting corrosion fatigue at a joint of the fastener and the structure.

* * * * *